(12) United States Patent
Liang et al.

(10) Patent No.: US 11,060,331 B2
(45) Date of Patent: Jul. 13, 2021

(54) ENGINE DOOR AND LATCH ASSEMBLY

(71) Applicant: MRA Systems, LLC, Baltimore, MD (US)

(72) Inventors: Yantao Liang, Shanghai (CN); Quan Zhou, Shanghai (CN)

(73) Assignee: MRA SYSTEMS, LLC, Baltimore, MD (US)

( * ) Notice: Subject to any disclaimer, the term of this patent is extended or adjusted under 35 U.S.C. 154(b) by 849 days.

(21) Appl. No.: 14/907,076

(22) PCT Filed: Jul. 24, 2013

(86) PCT No.: PCT/CN2013/079996
§ 371 (c)(1),
(2) Date: Jan. 22, 2016

(87) PCT Pub. No.: WO2015/010271
PCT Pub. Date: Jan. 29, 2015

(65) Prior Publication Data
US 2016/0145918 A1    May 26, 2016

(51) Int. Cl.
*E05C 19/12* (2006.01)
*E05B 15/02* (2006.01)
(Continued)

(52) U.S. Cl.
CPC ............ *E05C 19/12* (2013.01); *B64C 1/1446* (2013.01); *B64D 29/08* (2013.01); *E05B 15/022* (2013.01);
(Continued)

(58) Field of Classification Search
CPC ..... B64C 1/1446; B64D 29/08; E05B 15/022; E05B 65/102; E05C 3/12; E05C 3/16;
(Continued)

(56) References Cited

U.S. PATENT DOCUMENTS 2,973,217 A * 2/1961 Gregoire ............... E05C 17/042
292/288
3,585,757 A * 6/1971 Ritchie ................. B64C 1/1407
244/129.5
(Continued)

FOREIGN PATENT DOCUMENTS

CA         2418701 C     9/2010
CN      101585410 A     11/2009
(Continued)

OTHER PUBLICATIONS

PCT Search Report and Written Opinion issued in connection with corresponding Application No. PCT/CN2013/079996 dated May 19, 2014.
(Continued)

*Primary Examiner* — Kristina R Fulton
*Assistant Examiner* — Faria F Ahmad
(74) *Attorney, Agent, or Firm* — Xsensus LLP

(57) ABSTRACT

A latch assembly for a door is provided. The latch assembly includes a latch keep carried by one of the door and the surrounding structure and having a strike seat in which a strike may be removably received, a latch carried by the other of the door and the surrounding structure and having a catch configured to engage the strike, and a cable having a first portion secured to the other of the door and the surrounding structure and a second portion carrying the strike.

16 Claims, 10 Drawing Sheets

(51) Int. Cl.
| | |
|---|---|
| *E05B 65/10* | (2006.01) |
| *B64C 1/14* | (2006.01) |
| *E05C 17/36* | (2006.01) |
| *B64D 29/08* | (2006.01) |
| *E05C 3/12* | (2006.01) |
| *E05C 3/16* | (2006.01) |
| *E05C 17/16* | (2006.01) |
| *E05C 9/22* | (2006.01) |
| *E05C 9/20* | (2006.01) |
| *E05C 9/24* | (2006.01) |

(52) U.S. Cl.
CPC ............. *E05B 65/102* (2013.01); *E05C 3/12* (2013.01); *E05C 3/16* (2013.01); *E05C 17/36* (2013.01); *E05C 9/20* (2013.01); *E05C 9/22* (2013.01); *E05C 9/24* (2013.01); *E05C 17/16* (2013.01); *Y10S 292/65* (2013.01); *Y10T 292/03* (2015.04); *Y10T 292/087* (2015.04); *Y10T 292/28* (2015.04)

(58) Field of Classification Search
CPC . E05C 17/36; E05C 17/16; E05C 9/20; E05C 9/22; E05C 9/24; B62D 33/027; B60P 1/267; Y10T 292/28; Y10T 292/087; Y10T 292/0875; Y10T 292/03; Y10S 292/65
USPC ............ 292/262, 246, 250; 244/129.5, 129.4
See application file for complete search history.

(56) References Cited

U.S. PATENT DOCUMENTS

| | | | | |
|---|---|---|---|---|
| 3,851,845 | A * | 12/1974 | Edwards | B64C 1/1407 16/254 |
| 4,086,726 | A * | 5/1978 | Moses | B64C 1/24 244/129.5 |
| 4,088,288 | A * | 5/1978 | Barnes | B64C 1/1415 14/69.5 |
| 4,125,235 | A * | 11/1978 | Fitzgerald | B64C 1/143 244/129.5 |
| 4,167,258 | A * | 9/1979 | Robertson | B64C 1/1415 244/129.5 |
| 4,375,876 | A * | 3/1983 | Stewart | B64C 1/1438 160/201 |
| 4,470,566 | A * | 9/1984 | Fitzgerald | B64C 1/1407 244/129.1 |
| 4,497,462 | A * | 2/1985 | Hamatani | B64C 1/1415 244/129.5 |
| 4,613,099 | A | 9/1986 | Smith et al. | |
| 4,666,194 | A * | 5/1987 | Charman | E05C 17/36 292/288 |
| 4,667,993 | A * | 5/1987 | Hannesson | E05C 17/042 24/298 |
| 4,825,644 | A | 5/1989 | Bubello et al. | |
| 4,989,808 | A * | 2/1991 | Spraggins | B64C 1/1407 244/118.5 |
| 5,064,147 | A * | 11/1991 | Noble | B64C 1/1407 244/129.5 |
| 5,163,724 | A * | 11/1992 | Conte | E05C 17/042 269/249 |
| 5,228,737 | A * | 7/1993 | Zimmerman | B62D 25/12 217/61 |
| 5,297,828 | A * | 3/1994 | Chung | E05C 17/36 292/258 |
| 5,647,619 | A * | 7/1997 | DeLisio | E05C 17/36 292/262 |
| 5,707,095 | A * | 1/1998 | Pribak | B62D 33/0273 16/82 |
| 6,189,832 | B1 | 2/2001 | Jackson | |
| 6,267,429 | B1 * | 7/2001 | Kuzmich | B60P 1/26 296/50 |
| 6,428,062 | B1 * | 8/2002 | Roehl | E05C 17/042 292/339 |
| 6,598,436 | B2 * | 7/2003 | Ponn | E05B 79/20 292/201 |
| 6,648,381 | B2 * | 11/2003 | Holton | E05C 17/042 24/298 |
| 7,093,876 | B2 * | 8/2006 | Romig | B60P 1/26 296/50 |
| 7,243,973 | B2 * | 7/2007 | Plett | B62D 33/0273 296/57.1 |
| 7,556,303 | B2 * | 7/2009 | Waldner | B62D 33/037 292/194 |
| 7,600,716 | B2 * | 10/2009 | French | B64C 1/1469 160/130 |
| 7,823,834 | B2 * | 11/2010 | French | B64C 1/1469 244/129.4 |
| 7,832,686 | B2 * | 11/2010 | Erben | B64C 1/14 16/366 |
| 8,096,498 | B2 * | 1/2012 | Francisco | B64D 41/00 244/129.5 |
| 8,439,308 | B2 * | 5/2013 | Armstrong | G05B 21/02 244/129.4 |
| 9,139,236 | B2 * | 9/2015 | Waskie | B62D 33/0273 |
| 9,278,718 | B1 * | 3/2016 | Cooper | E05C 17/36 |
| 9,353,559 | B2 * | 5/2016 | Fabre | E05C 19/145 |
| 9,587,516 | B2 * | 3/2017 | Fabre | E05B 11/02 |
| 9,828,042 | B2 * | 11/2017 | Miles | E05B 83/16 |
| 9,956,995 | B1 * | 5/2018 | Neighbors | B62D 33/027 |
| 10,634,060 | B2 * | 4/2020 | Song | F02C 3/04 |
| 2004/0012208 | A1 | 1/2004 | Ruiz et al. | |
| 2007/0095985 | A1 * | 5/2007 | Wiers | B64C 1/1407 244/129.5 |
| 2011/0017866 | A1 | 1/2011 | Soulier et al. | |
| 2011/0057469 | A1 * | 3/2011 | Zielinsky | B60P 1/267 296/57.1 |
| 2011/0173895 | A1 * | 7/2011 | Lund | E05C 17/30 49/501 |
| 2011/0227350 | A1 | 9/2011 | Do | |
| 2015/0375845 | A1 * | 12/2015 | Salgues | B64C 1/1407 244/129.5 |
| 2015/0375866 | A1 * | 12/2015 | Salgues | B64D 13/04 244/129.5 |
| 2016/0039517 | A1 * | 2/2016 | Peltier | B64C 25/14 244/129.5 |
| 2016/0144944 | A1 * | 5/2016 | Goings | B64D 11/0023 244/129.5 |
| 2016/0200416 | A1 * | 7/2016 | Steger | E05D 15/48 244/129.5 |
| 2018/0038139 | A1 * | 2/2018 | Zindler | E05B 81/20 |

FOREIGN PATENT DOCUMENTS

| | | |
|---|---|---|
| CN | 101778987 A | 7/2010 |
| CN | 102235125 A | 11/2011 |
| CN | 202163619 U | 3/2012 |
| EP | 2586707 A1 | 5/2013 |

OTHER PUBLICATIONS

Unofficial English Translation of Chinese Office Action issued in connection with corresponding CN Application No. 201380078442.1 dated Sep. 20, 2016.

* cited by examiner

ENGINE DOOR AND LATCH ASSEMBLY

CROSS-REFERENCE TO RELATED APPLICATIONS

This application is a national stage application under 35 U.S.C. § 371(c) of prior filed, co-pending PCT application serial number PCT/CN2013/079996, filed on Jul. 24, 2013, and titled "ENGINE DOOR AND LATCH ASSEMBLY". The above-listed application is herein incorporated by reference.

BACKGROUND

Contemporary aircraft may include engines with pressure relief systems. For example, a sudden pressure rise may occur in a nacelle compartment of the engine and this may cause stresses in the compartment which may result in failure of nacelle components or unacceptable deformation of the nacelle. Accordingly, the engine typically features some means for pressure relief to prevent damage to nacelle components.

BRIEF DESCRIPTION

Embodiments of the innovation relate to a latch assembly for a door pivotally mounted to a surrounding structure for pivotal movement between an opened position and a closed position, the latch assembly includes a latch keep carried by one of the door and the structure and having a removable strike located within a strike seat, a latch carried by the other of the door and the structure and having a catch configured to engage the strike, and a cable having a first portion secured to the other of the door and structure and a second portion carrying the strike. The strike is located within the strike seat and the catch will engage the strike and latch the door in the closed position thereby ensuring a coupling of the cable between the door and the structure.

DETAILED DESCRIPTION

Figure 1:
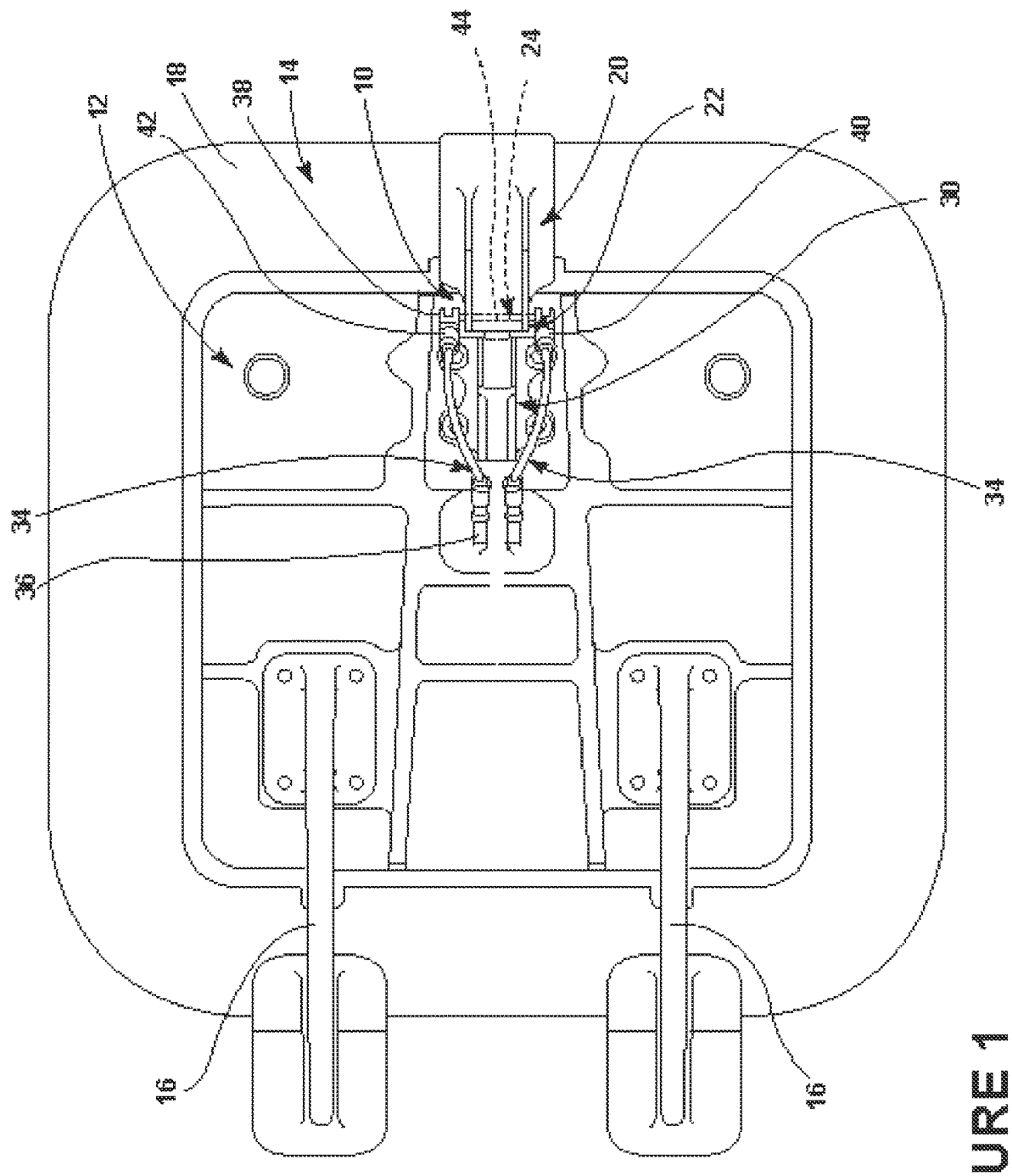
FIG. 1 is a bottom view of a door and a latch assembly with the door in a closed position in accordance with various aspects described herein.
Figure 2:
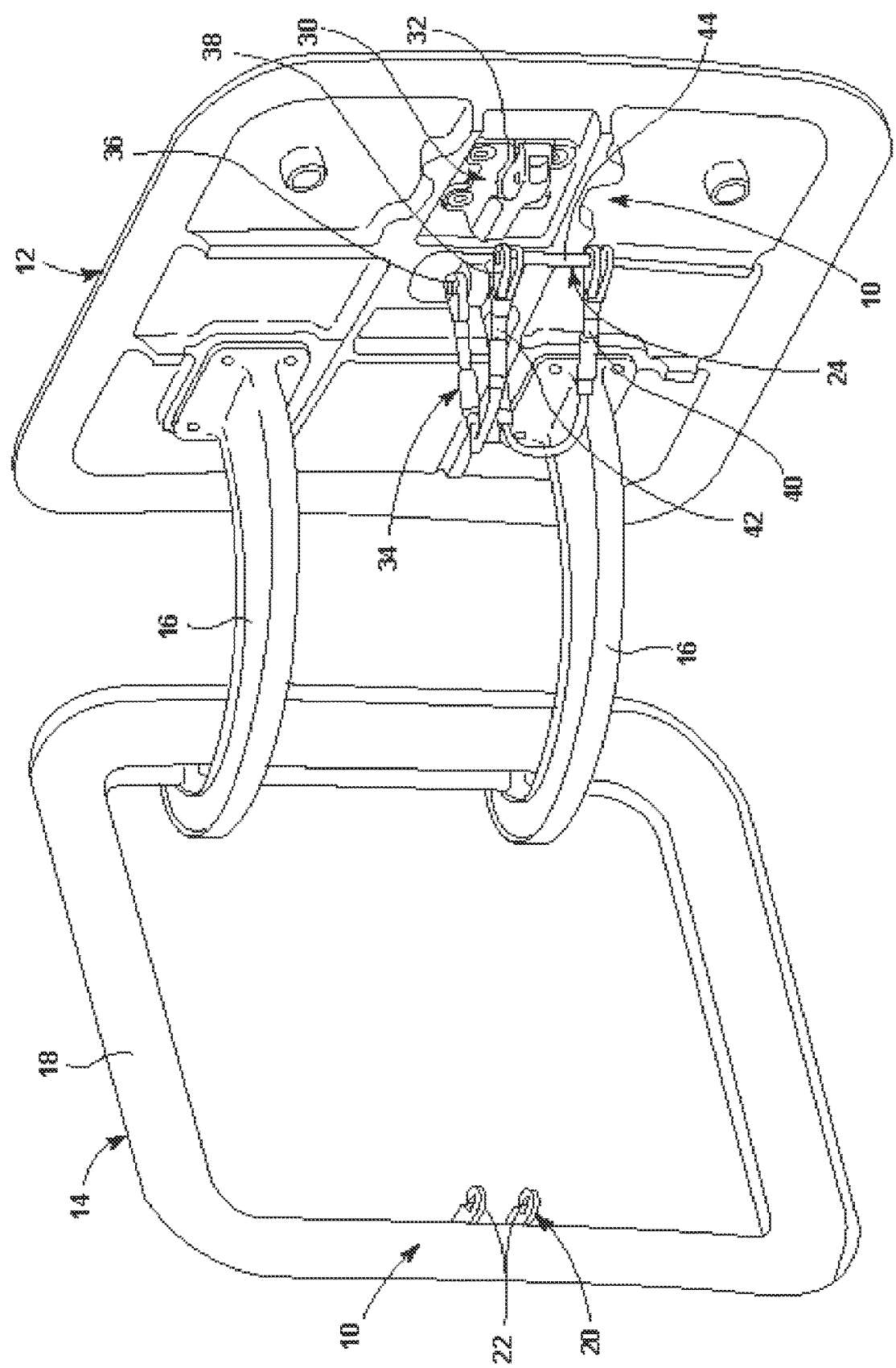
FIG. 2 is a perspective view of the door in an opened position in accordance with various aspects described herein.

FIG. 1 illustrates a latch assembly 10 for a door 12, which is pivotally mounted to a surrounding structure 14. It will be understood that the door 12 may be pivotally mounted to any suitable surrounding structure in any suitable manner including through use of hinges 16. For example, the door 12 may be pivotally mounted to a portion of a nacelle 18 of an aircraft engine, which forms the surrounding structure 14. In such an instance the door 12 may provide access to an oil tank and may be pivoted 90° to a fully open position (i.e., a second open position) so that a user may have access to an oil tank on the engine. The door 12 may be pivotally mounted for pivotal movement between a closed position as shown in FIG. 1 and an a second opened position as shown in FIG. 2.

Figure 3A:
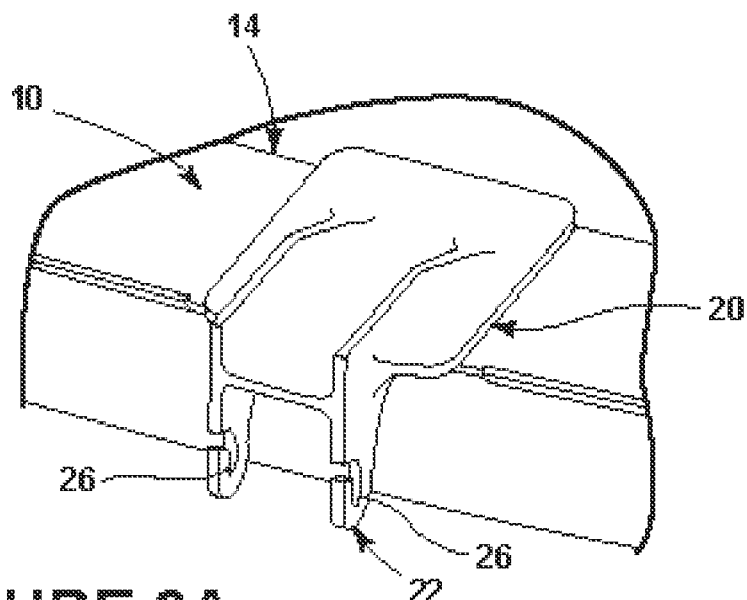
FIGS. 3A and 3B illustrate perspective views of portions of the latch assembly in accordance with various aspects described herein.

FIG. 3A illustrates a latch keep 20 that may form a portion of the latch assembly 10 and may be carried by one of the door 12 and the surrounding structure 14. A strike seat 22 of the latch keep 20 may be formed to retain a strike 24 (FIG. 3B) that may be removably received in the strike seat 22. In the illustrated example, the latch keep 20 is operably coupled with the surrounding structure 14. The latch keep 20 and its strike seat 22 may be formed in any suitable manner. For example, the strike seat 22 may include a hook 26 for receiving the strike 24. In the illustrated example, the strike seat 22 has been shown as including a pair of spaced hooks 26. The hooks 26 are oriented such that each hook 26 opens non-aligned from a pivoting direction of the door 12 from the closed position to the opened position.

Figure 3B:
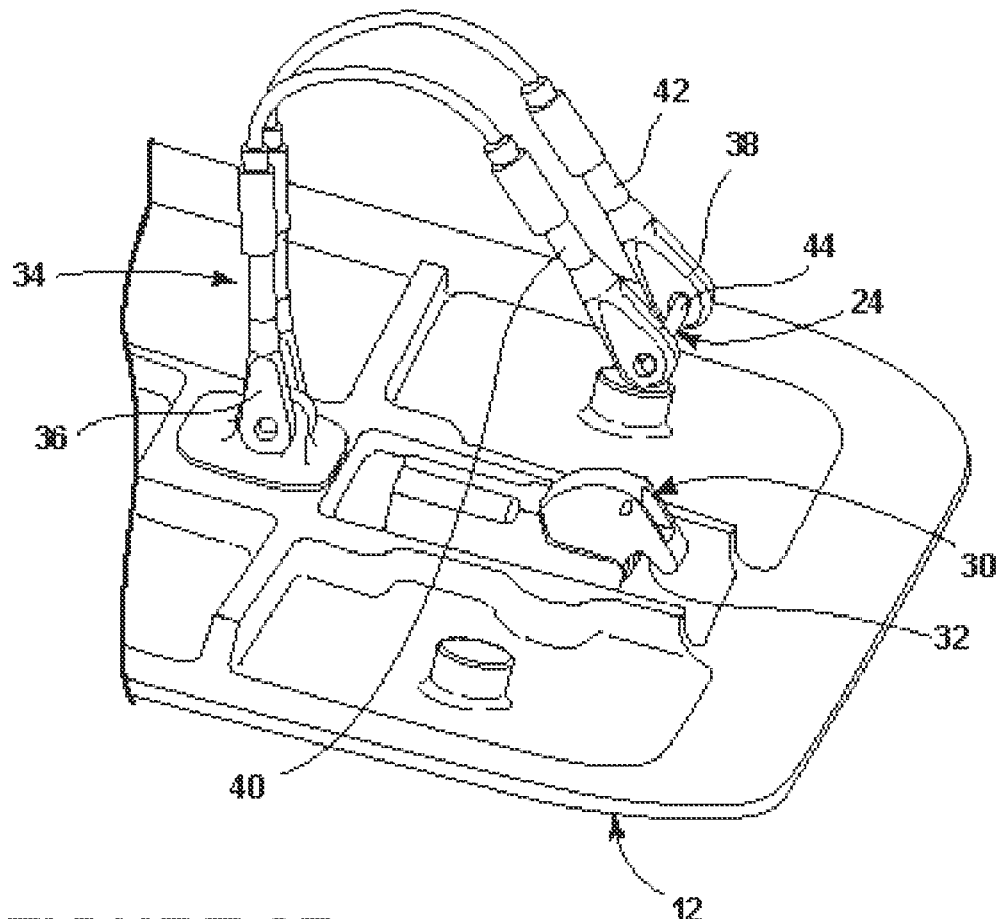

FIG. 3B illustrates a latch 30 that may form another portion of the latch assembly 10 and may be carried by the other of the door 12 and the surrounding structure 14. In the illustrated example, the latch 30 is carried by the door 12. A catch 32 is included in the latch 30 and is configured to engage the strike 24. The catch 32 may be any suitable catch capable of engaging and retaining the strike 24.

A cable 34 having a first portion 36, which is also secured to the other of the door 12 and surrounding structure 14 and in the illustrated example, is coupled with the door 12. A second portion 38 of the cable 34 carries the strike 24 of the latch assembly 10. The strike 24 may take any suitable form, including that the strike 24 may include a pin 44. It is contemplated that the second portion 38 of the cable 34 may have first and second spaced strands 40 and 42 with the pin 44 spanning the first and second spaced strands 40 and 42. As illustrated, the first and second spaced strands 40 and 42 may extend the length of the cable 34 and each of the first and second spaced strands 40 and 42 has a second end connected to the pin 44 and a first end connected to the door 12. More specifically, the first end of the first and second spaced strands 40 and 42, corresponding to the first portion 36, is connected to an inner surface of the door 12.

Figure 4:
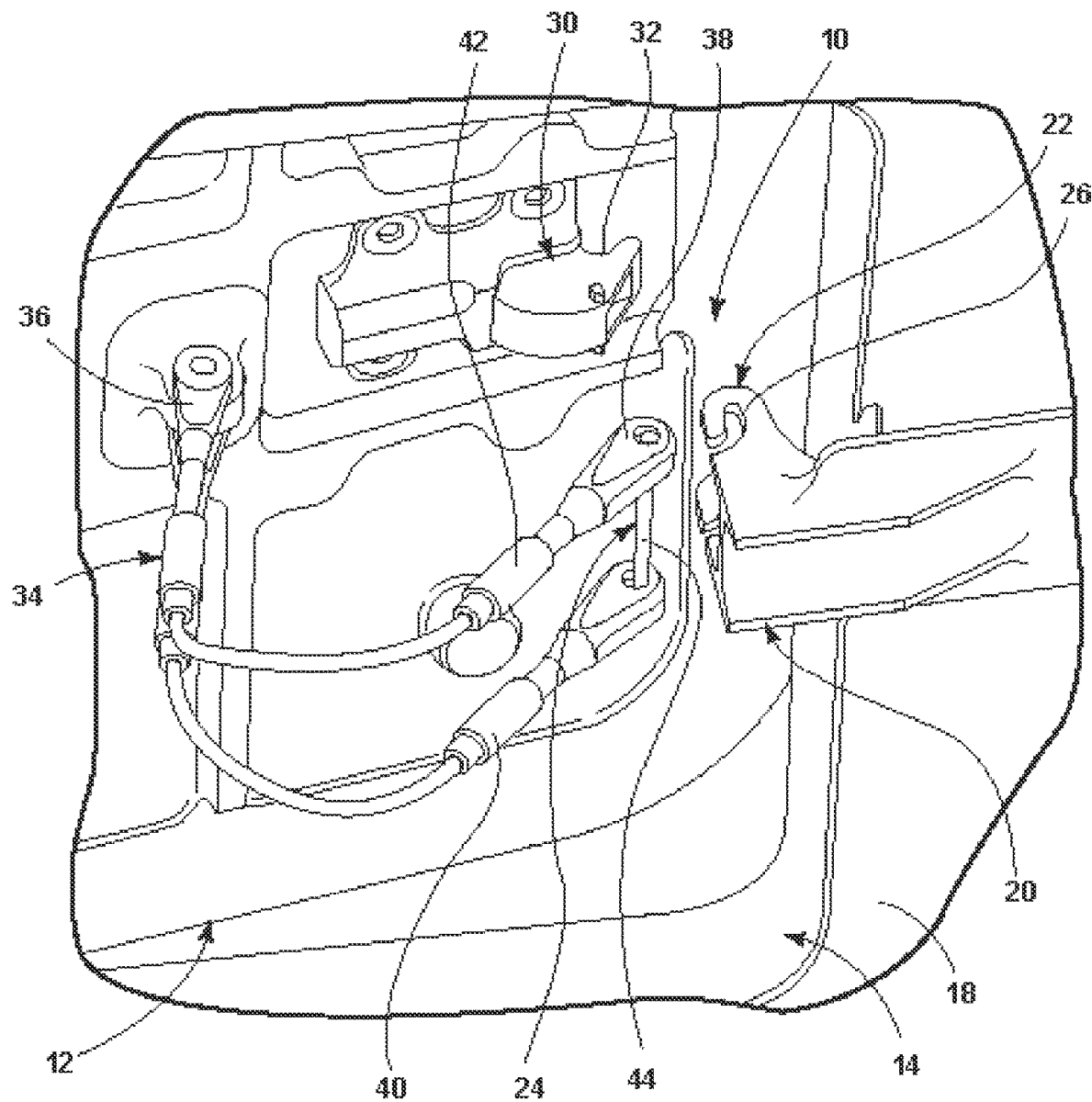
FIG. 4 is a partial perspective view of a pin before it is mounted in a strike seat of the latch assembly in accordance with various aspects described herein.
Figure 5A:
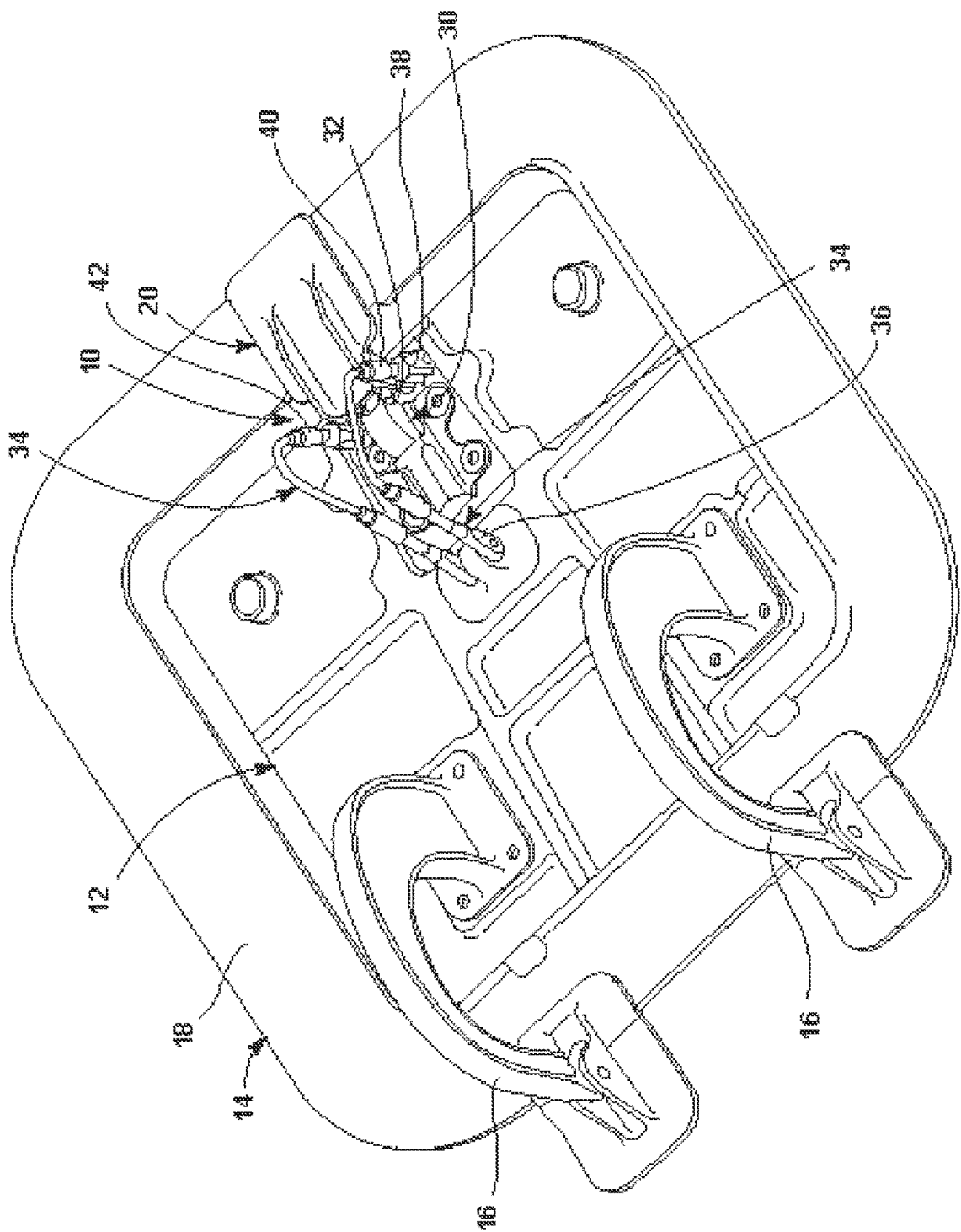
FIGS. 5A, 5B, 5C and 5D are views of the door in a closed position in accordance with various aspects described herein.
Figure 5B:
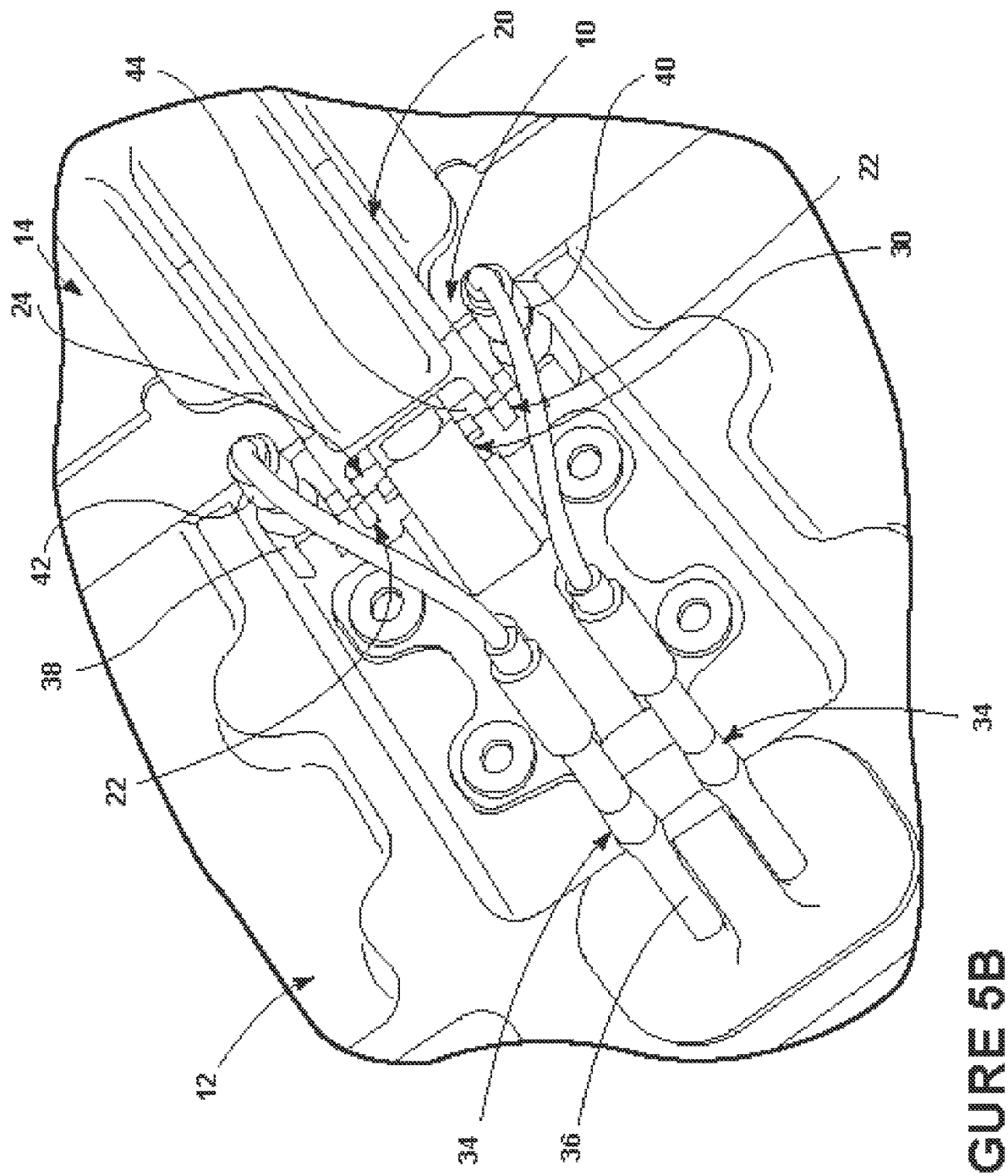
Figure 5C:
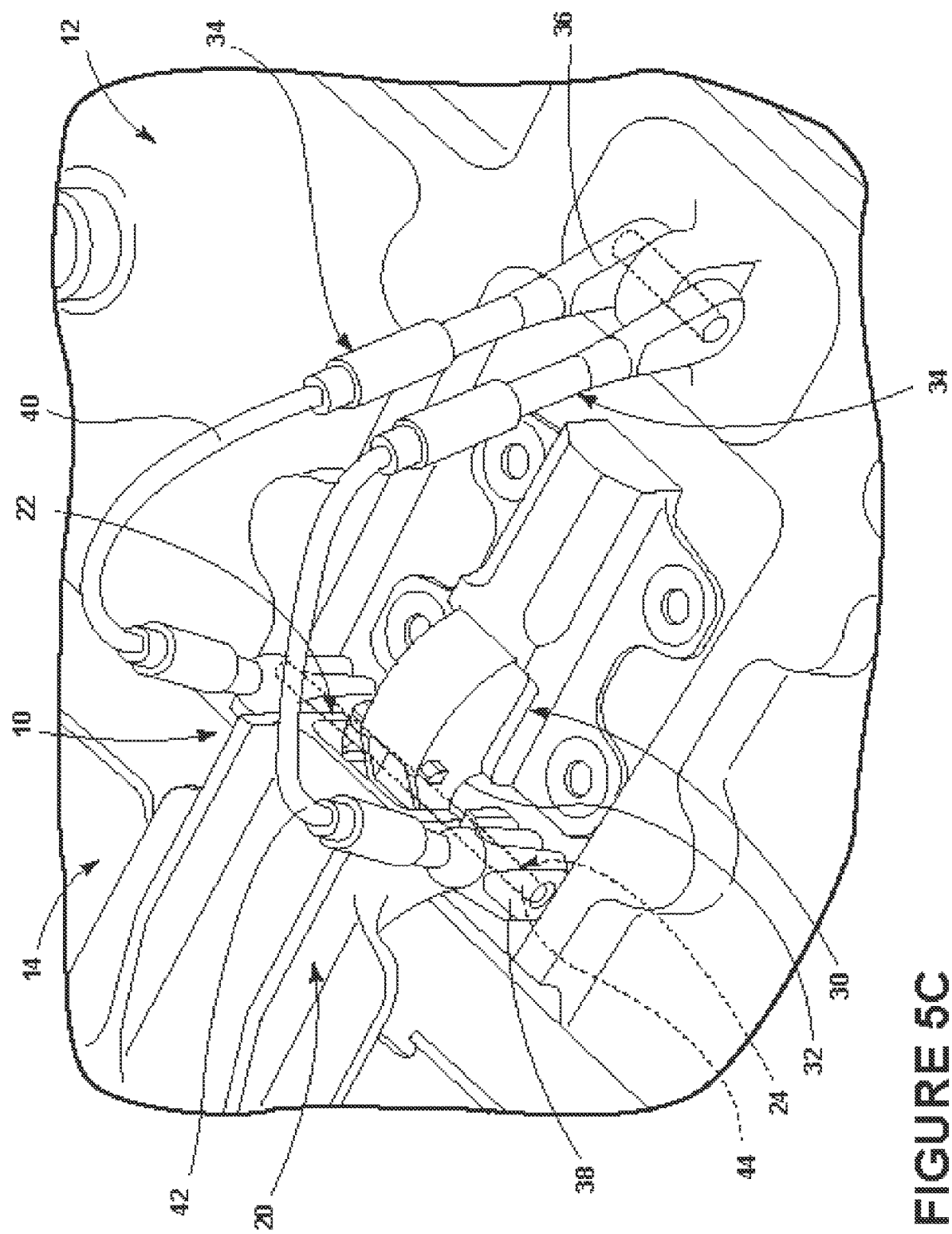
Figure 5D:
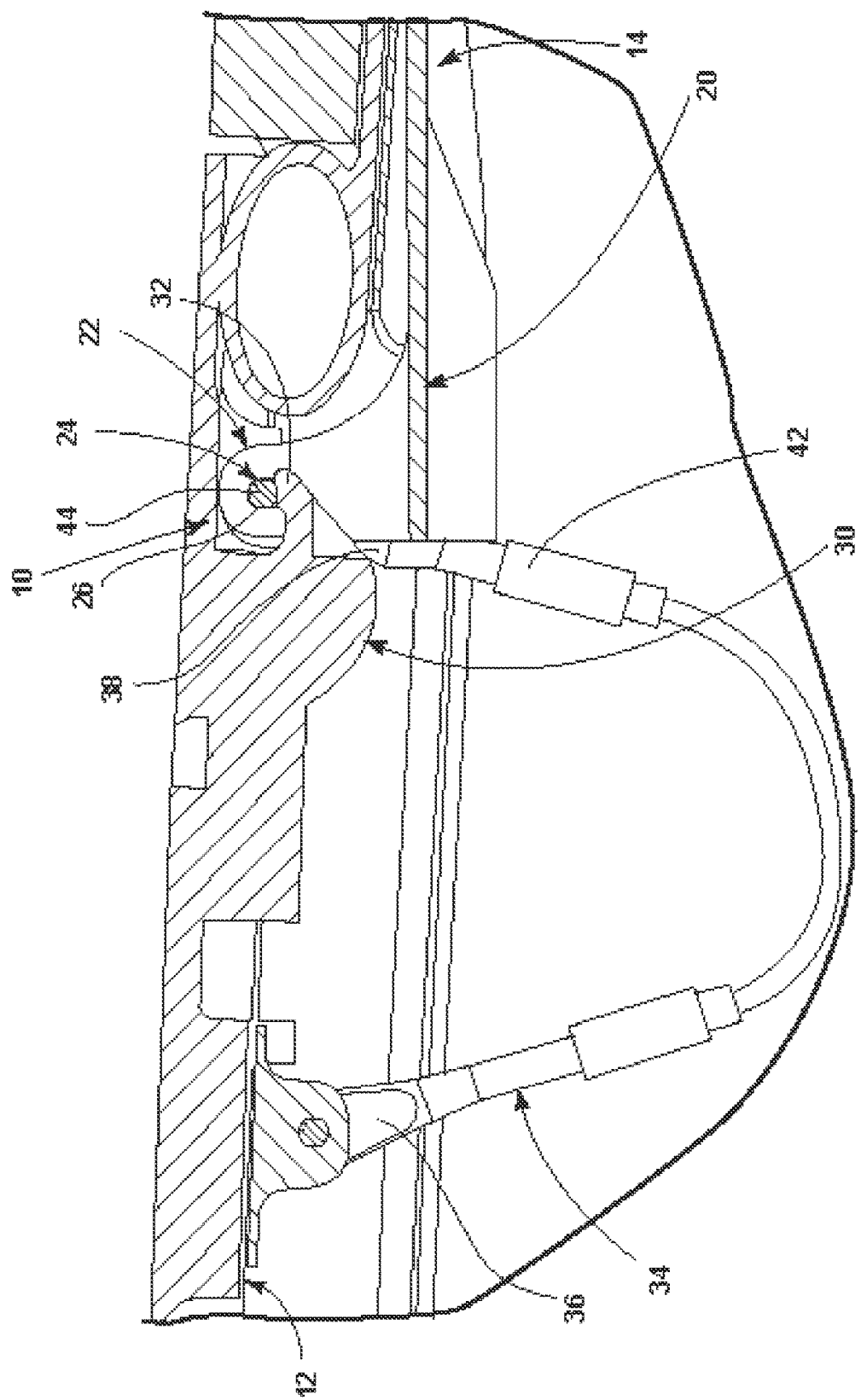

When beginning to close the door 12, as is shown in FIG. 4, a user may place the strike 24 into the strike seat 22. When the strike 24 is located within the strike seat 22, the user may shut the door, which moves the catch 32 to engage the strike 24 and latch the door 12 in the closed position, as shown in FIG. 5A. If the strike 24 is not retained by the latch keep 20, the latch assembly 10 cannot be locked. This ensures the user must couple the cable 34 between the door 12 and the surrounding structure 14 in order to latch the door. FIGS. 5B and 5C show additional views of the strike 24 retained by the latch keep 20 and the catch 32 engaging the strike 24. Further, the hook 26 of the strike seat 22 may be oriented such that contacting of the pin 44 with the catch 32 presses the pin 44 into the strike seat 22 as more clearly seen in FIG. 5D.

Figure 6A:
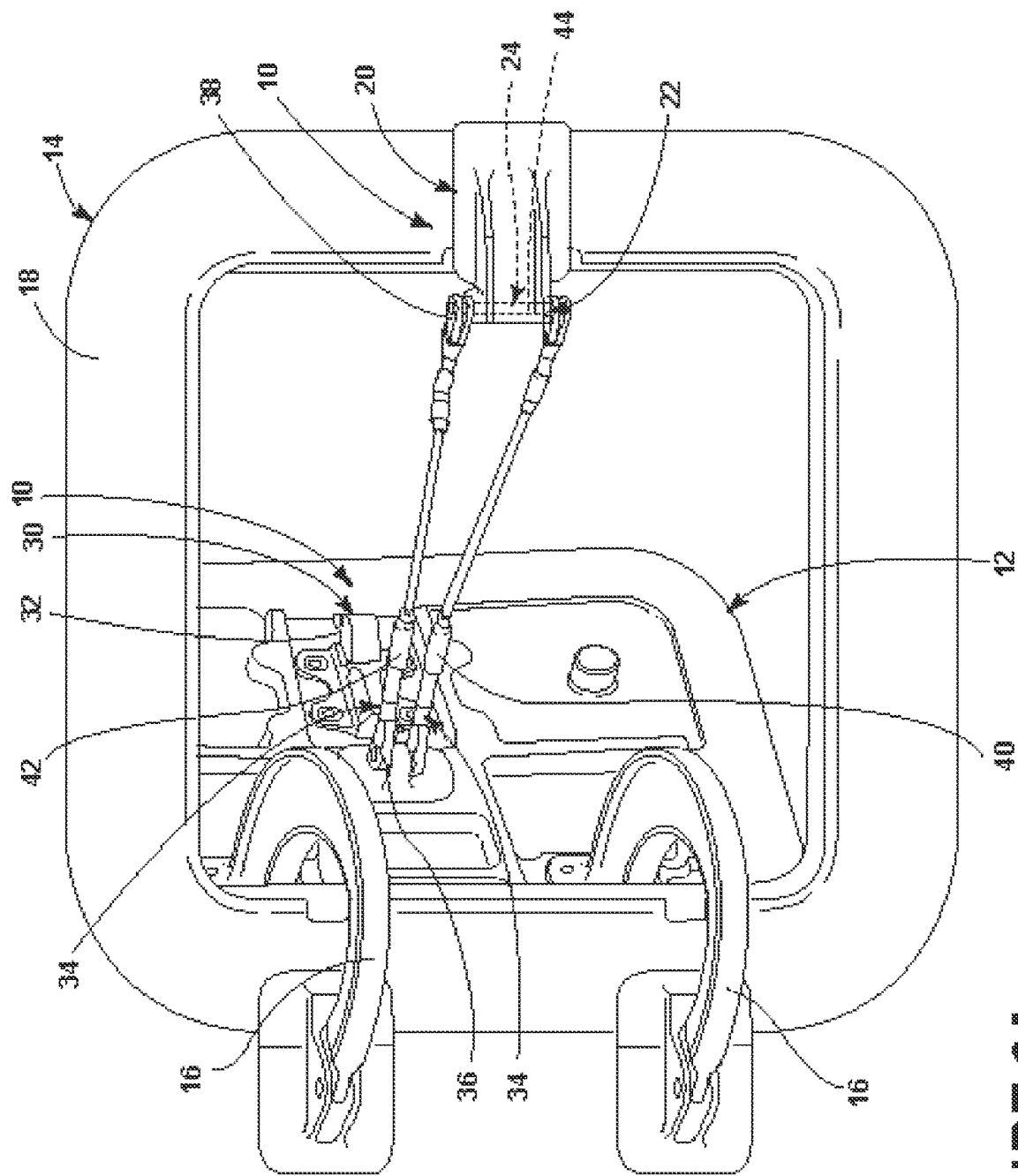
FIGS. 6A and 6B are views of the door in an opened position and acting as a pressure relief door in accordance with various aspects described herein.
Figure 6B:
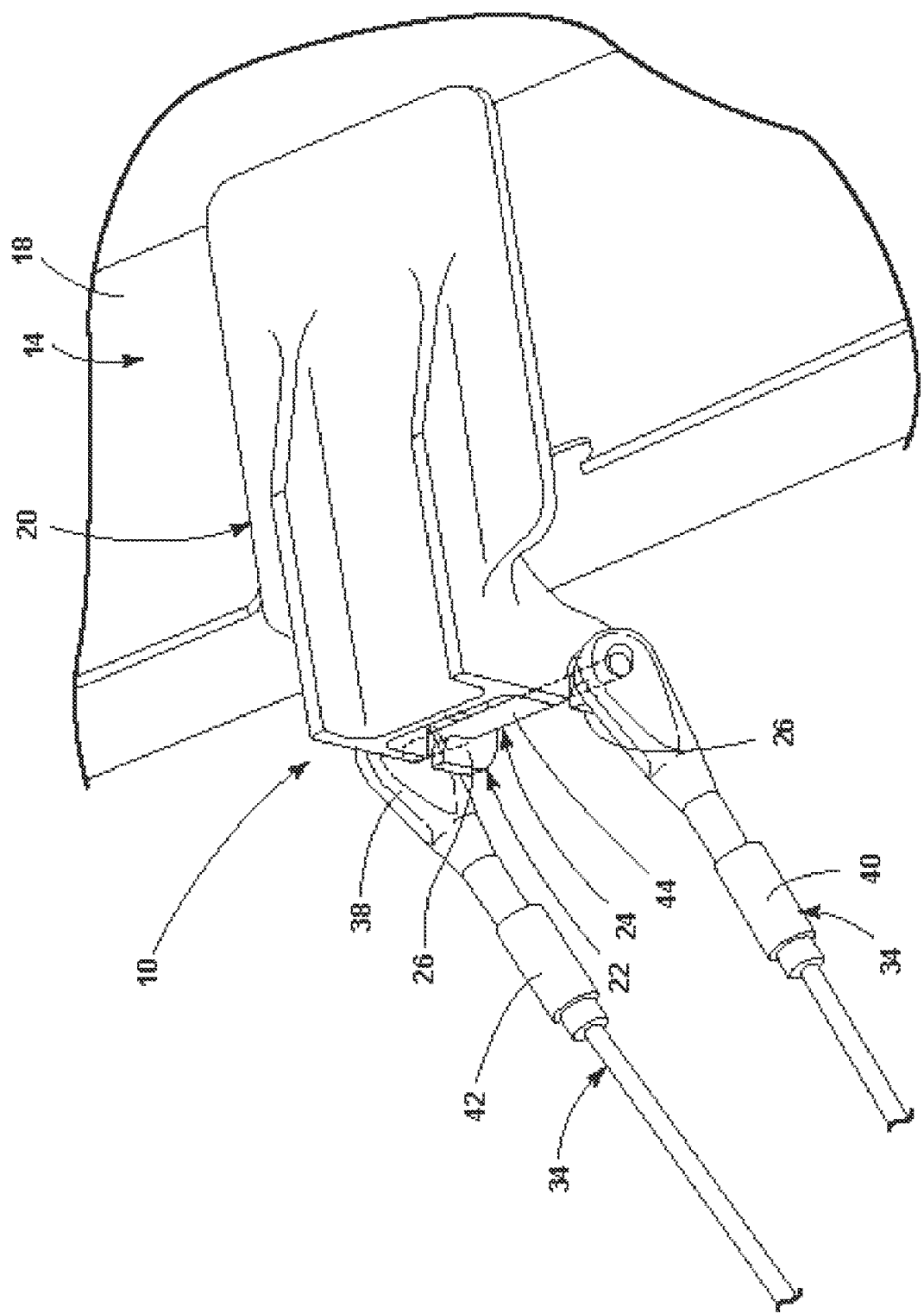

After the pin 44 has been retained by the strike seat 22 and the door 12 has presumably been closed, the door 12 may be moved to a first opened position and may act as pressure relief door. As illustrated in FIG. 6A, the latch keep 20 retains the pin 44 when the door 12 is moved to the first opened position. FIG. 6B illustrates that the hooks 26 continue to retain the strike 24 when the door 12 is moved to the first opened position. In this manner, the latch assembly 10 may be operable between a latch position, where the door 12 is held in the closed position, and a release position, where the door 12 may be pivoted to the first opened position.

The embodiments described above provide for a variety of benefits including that the embodiments ensure a coupling of the cable between the door and the structure such that when the door works as pressure relief door the cable may limit the open angle of the door and make sure during the pressure relief process that the no damage will occur. In contemporary aircraft there is a potential risk of maintenance personnel forgetting to load the pressure relief function of the door and the above described embodiments may prevent such oversight because the embodiments ensure the cable is connected between the door and the structure.

To the extent not already described, the different features and structures of the various embodiments may be used in combination with each other as desired. That one feature may not be illustrated in all of the embodiments is not meant to be construed that it may not be, but is done for brevity of description. Thus, the various features of the different embodiments may be mixed and matched as desired to form new embodiments, whether or not the new embodiments are expressly described. All combinations or permutations of features described herein are covered by this disclosure.

This written description uses examples to disclose the innovation, including the best mode, and also to enable any person skilled in the art to practice the innovation, including making and using any devices or systems and performing any incorporated methods. The patentable scope of the innovation is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A latch assembly for a door pivotally mounted to a surrounding structure for pivotal movement along a common pivotal axis between a first opened position, a second opened position, and a closed position, the latch assembly comprising:
    a latch keep carried by one of the door and the structure and having a strike seat in which a strike may be removably received;
    a latch carried by the other of the door and the structure and having a catch configured to engage the strike; and
    a cable having a first portion secured to the other of the door and structure and a second portion carrying the strike;
    wherein when the strike is located within the strike seat, the catch is configured to engage the strike and hold the door in the closed position thereby ensuring a coupling of the cable between the door and the structure,
    when the strike is located within the strike seat, the door is prevented from opening beyond the first opened position along the common pivotal axis so that the door functions as a pressure relief door, and
    when the strike is not located within the strike seat, the door is enabled to open beyond the first opened position to the second opened position along the common pivotal axis so that the door functions as an access door.

2. The latch assembly of claim 1 wherein the strike comprises a pin removably mounted in the strike seat.

3. The latch assembly of claim 2 wherein the strike seat comprises a hook receiving the pin.

4. The latch assembly of claim 3 wherein the hook is oriented such that the hook opens non-aligned from a pivoting direction of the door from the closed position to the first opened position.

5. The latch assembly of claim 4 wherein the hook is oriented such that contacting of the pin with the catch presses the pin into the strike seat.

6. The latch assembly of claim 2 wherein the second portion of the cable has first and second spaced strands with the pin spanning the first and second spaced strands.

7. The latch assembly of claim 6 wherein the first and second spaced strands extend the length of the cable and each strand has a second end connected to the pin and a first end connected to the door.

8. The latch assembly of claim 7 wherein the first end of each strand is connected to an inner surface of the door.

9. The latch assembly of claim 2 wherein the latch keep retains the pin when the door is moved to the first opened position.

10. A door and latch assembly for an aircraft engine, comprising:
    a door pivotally mounted to a portion of the engine and pivotally moveable along a common pivotal axis between a closed position, a first opened position, and a second opened position; and
    a latch assembly operable between a latch position, where the door is held in the closed position, and a release position, where the door may be pivoted to the first opened position and the second opened position, the latch comprising:
    a latch carried by one of the door and the portion of the engine and having a strike seat in which a strike nay be removably received;
    a latch carried by the other of the door and the portion of the engine and having a catch configured to engage the strike; and
    a cable having a first portion secured to the other of the door and the portion of the engine and a second portion carrying the strike;
    wherein when the strike is located within the strike seat, the catch is configured to engage the strike and hold the door in the closed position thereby ensuring a coupling of the cable between the door and the portion of the engine,
    when the strike is located within the strike seat, the door is prevented from opening beyond the first opened position along the common pivotal axis so that the door functions as a pressure relief door, and
    when the strike is not located within the strike seat, the door is enabled to open beyond the first opened position to the second opened position along the common pivotal axis so that the door functions as an access door.

11. The door and latch assembly of claim 10 wherein the strike comprises a pin removably mounted in the strike seat.

12. The door and latch assembly of claim 11 wherein the latch keep is operably coupled to the portion of the engine.

13. The door and latch assembly of claim 12 wherein the latch keep retains the pin when the door is moved to the first opened position.

14. The door and latch assembly of claim 11 wherein the strike seat comprises a pair of spaced hooks.

15. The latch assembly of claim 1 wherein when the strike is located within the strike seat, the catch will further retain the strike and latch the door in the closed position.

16. The door and latch assembly of claim 10 wherein when the strike is located within the strike seat, the catch will further retain the strike and latch the door in the closed position.

* * * * *